(12) United States Patent
Morita et al.

(10) Patent No.: US 6,912,105 B1
(45) Date of Patent: Jun. 28, 2005

(54) MAGNETIC DISK DEVICE WITH FIRMLY FIXED YOKES

(75) Inventors: Akira Morita, Zama (JP); Shingo Tsuda, Yokohama (JP); Yoshitaka Kakizaki, Yokohama (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 964 days.

(21) Appl. No.: 09/109,132

(22) Filed: Jul. 2, 1998

(30) Foreign Application Priority Data

Jul. 7, 1997 (JP) .............................................. 9-181549

(51) Int. Cl.$^7$ .......................... G11B 17/00; G11B 21/08
(52) U.S. Cl. ................................. 360/97.01; 360/264.7
(58) Field of Search ........................... 360/97.01, 97.02, 360/104, 105, 106, 107, 264.7

(56) References Cited

U.S. PATENT DOCUMENTS

| | | | | |
|---|---|---|---|---|
| 5,029,027 A | * | 7/1991 | Sleger ...................... | 360/97.01 |
| 5,109,310 A | * | 4/1992 | Ohkjita et al. ............... | 360/106 |
| 5,315,466 A | * | 5/1994 | Nishimoto et al. .......... | 360/106 |
| 5,363,260 A | * | 11/1994 | Kawakami ................... | 360/106 |
| 5,402,290 A | * | 3/1995 | Daniel ........................ | 360/106 |
| 5,483,400 A | * | 1/1996 | Tsujino ....................... | 360/106 |
| 5,875,067 A | * | 2/1999 | Morris et al. ............. | 360/97.01 |
| 5,886,850 A | * | 3/1999 | Kaczeus et al. .......... | 360/97.01 |

FOREIGN PATENT DOCUMENTS

| | | | | |
|---|---|---|---|---|
| JP | 4-111264 | 4/1992 | ........... | G11B/21/02 |
| JP | 4-258855 | 9/1992 | ........... | G11B/21/02 |

* cited by examiner

*Primary Examiner*—David Davis
(74) *Attorney, Agent, or Firm*—Robert B. Martin; Duke Amaniampong

(57) ABSTRACT

The present invention provides a magnetic disk device which firmly fixes the yokes of a rotary actuator between a base and a cover. The yoke can be made compact and the movable range of the rotary actuator can be wide. An attaching screw attaches a first yoke to a base and fixing screws passing through the second yoke and the first yoke from a cover are screwed to the base.

3 Claims, 7 Drawing Sheets

MAGNETIC DISK DEVICE WITH FIRMLY FIXED YOKES

BACKGROUND OF THE INVENTION

1. Field of the Invention

The present invention relates to a magnetic disk device including a rotatable magnetic disk, a rotatable carriage having a magnetic head attached to its end and a rotary actuator for rotating the carriage between a base and a cover.

2. Background and Related Art

Generally, the magnetic disk device as described above has been provided with a voice coil motor as a rotary actuator. The voice coil motor is equipped with a coil attached to a carriage and upper and lower yokes having magnets for applying a magnetic field to the coil.

Figure 8:
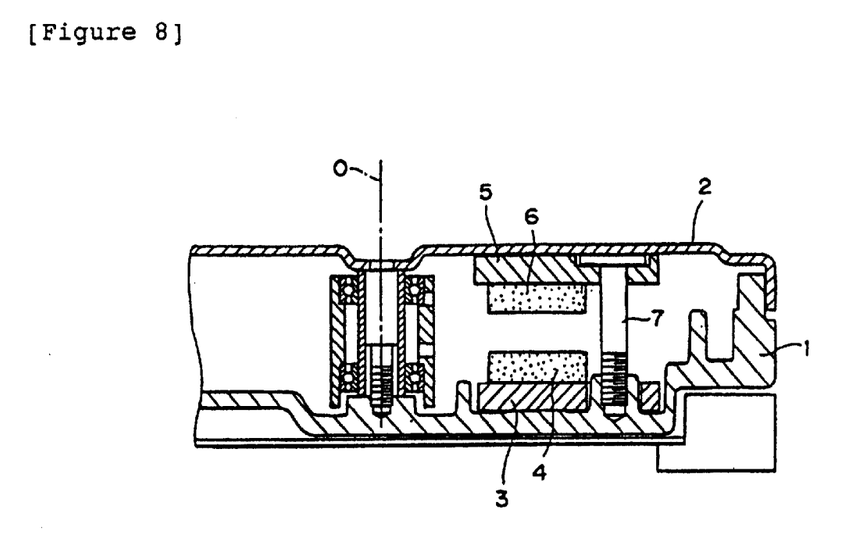
FIG. 8 is a sectional view showing parts for attaching yokes between a cover and a base in a conventional magnetic disk device.

Conventionally, an attaching part for attaching yokes for such a voice coil motor has been constructed as illustrated in FIG. 8. Referring to FIG. 8, reference numeral 1 designates a base, 2 designates a cover and a carriage (not illustrated) having a magnetic head attached to its end is provided so as to be rotatable about an axis O. Reference numeral 3 denotes a first lower yoke to which a first magnet 4 is attached, 5 designates a second upper yoke to which a second magnet 6 is attached and a coil (not shown) mounted on the carriage is located between the opposed surfaces of these magnets 4 and 6. The coil, the yokes 3 and 5 and the magnets 4 and 6 constitute the voice coil motor as the rotary actuator. The yokes 3 and 5 are connected together as one connected member, and then, the connected member is fixed to the base 1 by means of a fixing screw 7. The fixing screw 7 passes through the lower yoke 3 from the upper yoke 5 and is screwed to the base 1. After the yokes 3 and 5 are secured to the base 1 by means of the fixing screw 7, the cover 2 is mounted on them.

However, since the yokes 3 and 5 are only fixed to the base 1 by means of the fixing screw 7, it has been difficult to firmly secure them to the base. Further, when the carriage is rotated by the voice coil motor, the yokes 3 and 5 are vibrated thereby causing undesirable noise.

In addition, since the fixing screw 7 is located between the opposed surfaces of the yokes 3 and 5, the fixing screw 7 may become an obstacle when the carriage is mounted between the base and the cover. When the carriage and the magnetic disk are mounted between the base and the cover, the carriage needs to be mounted between the opposed surfaces of the yokes 3 and 5 while being largely separated from the magnetic disk in order to prevent the carriage from interfering with the magnetic disk. The fixing screw 7 located between the opposed surfaces of the yokes 3 and 5 disadvantageously restricts the mounting position of the carriage. Therefore, the position of the fixing screw 7 must be set outward such that the fixing screw 7 does not interfere with the carriage in its mounted position. As a result, the size of yokes 3 and has needed to be enlarged, which resulted in enlarging the size of the entire body of the magnetic disk device.

Accordingly, it is an object of the present invention to provide a magnetic disk device in which the generation of vibration or noise can be prevented by firmly fixing the yokes of a rotary actuator and the size of the yokes can be reduced.

It is another object of the present invention to provide a magnetic disk device in which the movable range of the rotary actuator can be set wide.

SUMMARY OF THE INVENTION

According to the present invention, there is provided a magnetic disk device having a rotatable magnetic disk, a rotatable carriage having a magnetic head attached to its end and a rotary actuator for rotating the carriage between a base and a cover. The rotary actuator includes a coil attached to the carriage, a first yoke having a first magnet attached thereto and opposed to the position of the coil, and a second yoke connected to the first yoke and having a second magnet attached thereto, opposed to the position of the coil. The magnetic disk device comprises an attaching member for attaching the first yoke to the base and fixing screws passing through the second yoke and the first yoke from the cover to thereby threadedly fix them to the base.

PREFERRED EMBODIMENT OF THE INVENTION

An embodiment of the present invention is described hereinafter by referring to FIGS. 1 to 7.

Figure 1:
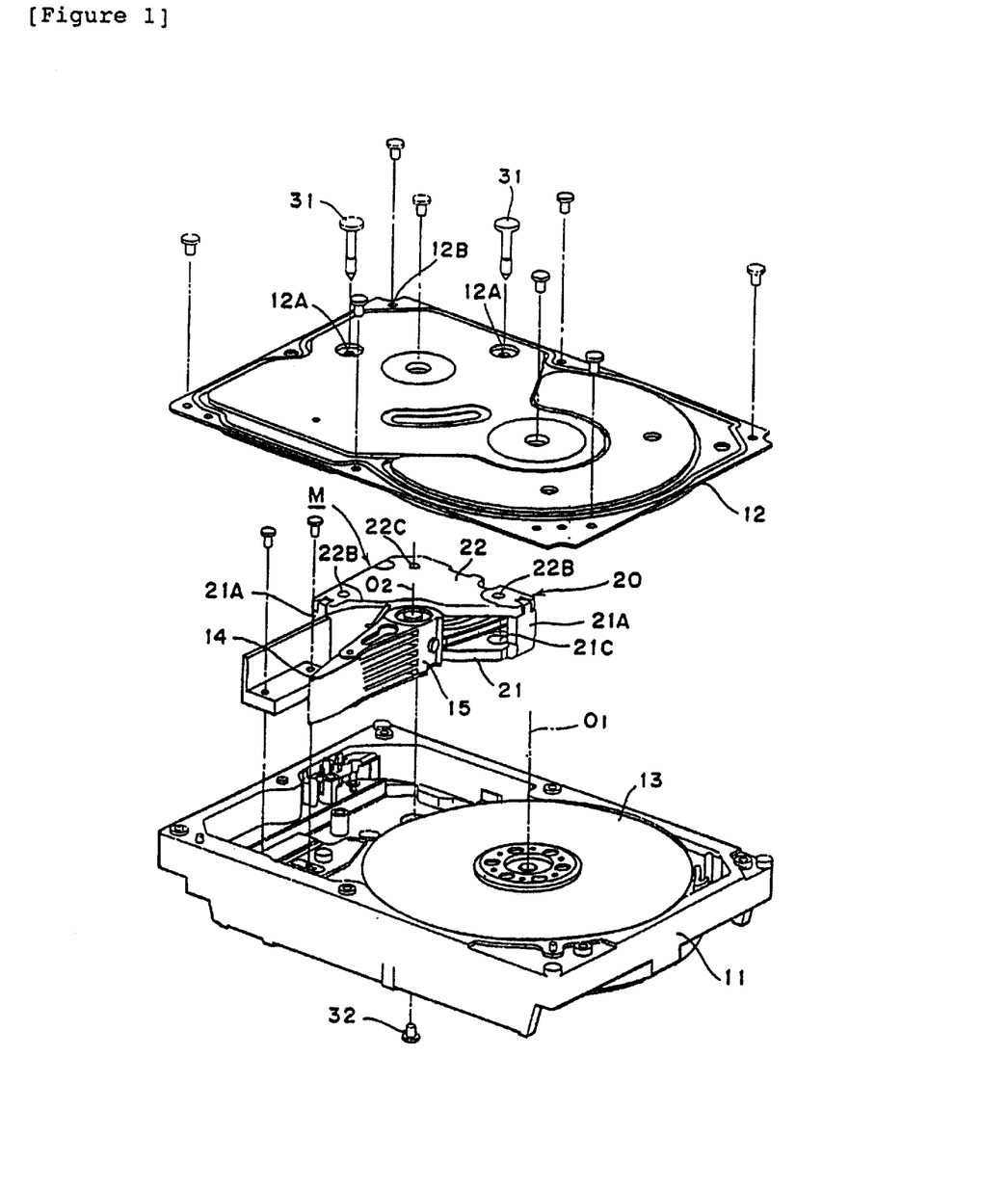
FIG. 1 shows an exploded perspective view of the entire body of a magnetic disk device according to an embodiment of the present invention.

FIG. 1 is an exploded perspective view of the entire body of a magnetic disk device. With reference to FIG. 1, reference numeral 11 designates a lower base, and 12 designates an upper cover. A magnetic disk 13 rotatable about an axis 01, a carriage 15 having a magnetic head 14 attached to its end and rotatable about an axis O2 and a voice coil motor M as a rotary actuator for rotating the carriage 15 are provided between the base and the cover. The voice coil motor M is provided with a coil 16 (see FIG. 2) attached to the carriage 15 and a yoke connecting member 20.

Figure 2:
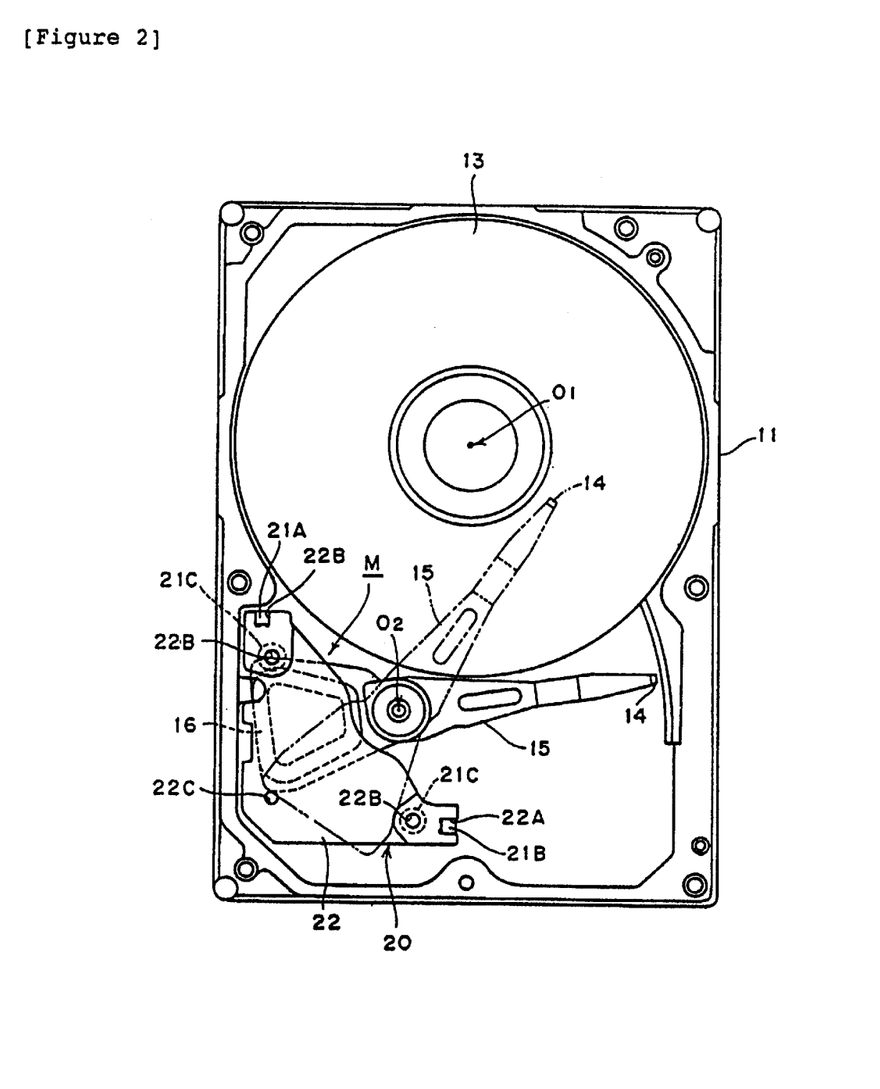
FIG. 2 is a plan view with the cover of the magnetic disk device shown in FIG. 1 removed.
Figure 3:
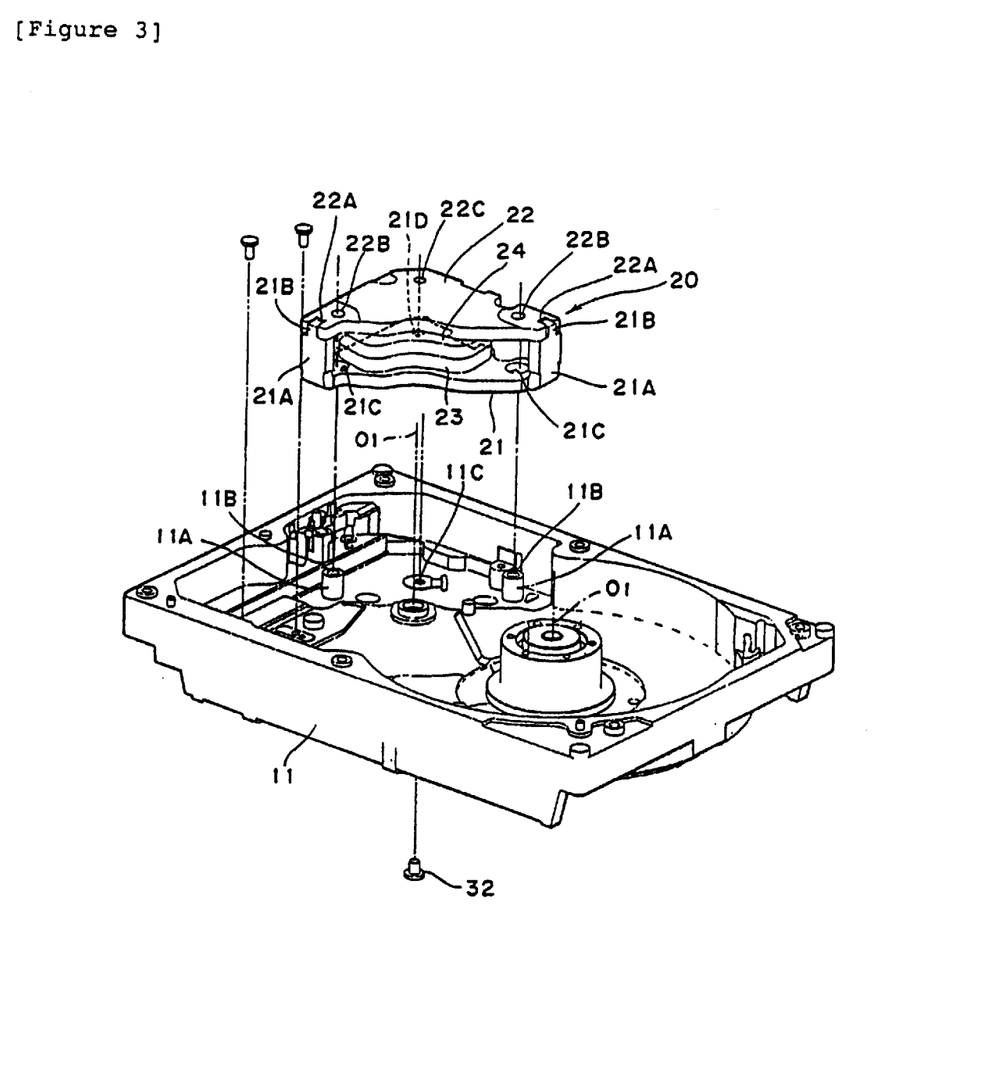
FIG. 3 is an exploded perspective view showing parts for attaching a yoke connecting member shown in FIG. 1 between a cover and a base.
Figure 4:
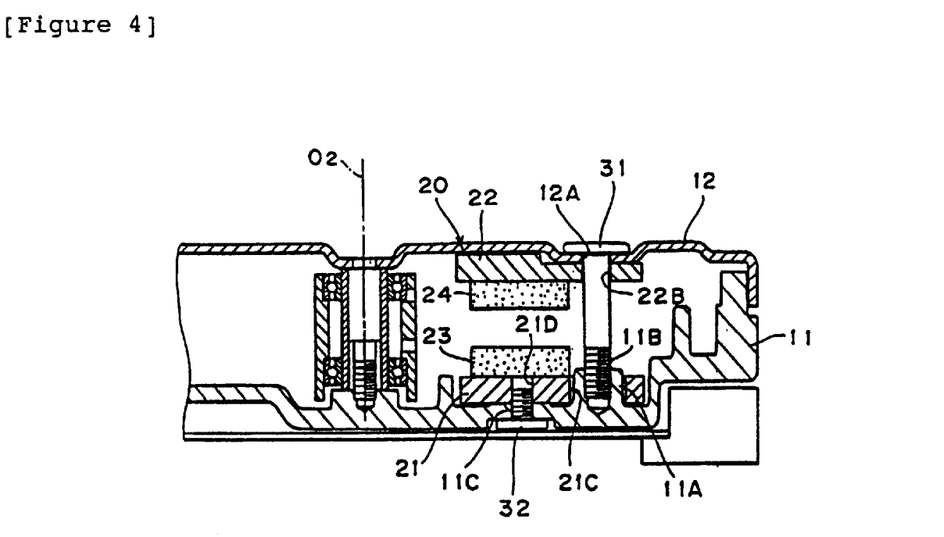
FIG. 4 is a sectional view showing the parts for attaching the yoke connecting member shown in FIG. 1.

FIG. 2 is a plan view of the magnetic disk device with the cover 12 removed. FIG. 3 is an exploded perspective view showing a part for attaching the yoke connecting member 20 to the base 11. FIG. 4 is a sectional view of a part for attaching the yoke connecting member 20 to the base 11 and the cover 12. In the yoke connecting member 20, reference numerals 21 and 22 represent first and second yokes substantially triangular in plan view. In FIG. 3, the right and left corners of the first yoke 21 are provided with bent parts 21A bent upward. A protruding part 21B is formed on the upper end of each of the bent parts 21A. Referring to FIG. 3, the right and left corners of the second yoke 22 are provided with cut-out 22A to which the protruding parts 21B are fitted. First and second magnets 23 and 24 are mounted on the respective inner surfaces of the first and second yokes 21 and 22 which are opposed to each other. The coil 16 attached to the carriage 15 is located in a magnetic field between the opposed surfaces.

As illustrated in FIG. 3, holes 21C and 21B are formed respectively on the same vertical axes as right and left parts of the first and second yokes 21 and 22. Each of the through holes 21C has a relatively large diameter so it can be fitted over each of circular cylinders 11A projected on the inner surface of the base 11. A fixing screw 31 is threadedly inserted into the central hole 11B of each of the circular cylinders 11A. As illustrated in FIG. 4, each fixing screw 31 passes through the hole 12A of the cover 12 and the through holes 22B and 21C and is screwed to the hole 11B of the circular cylinders 11A. Each of the through holes 22B has a relatively small diameter so as to pass the fixing screw 31 therethrough. Further, as shown in FIG. 4, a tapped hole 21D is formed on the central part of the first yoke 21 and meshes with a lower attaching screw (attaching member) 32 which is inserted into the hole 11C of the base 11.

As illustrated by solid lines in FIGS. 1 and 3, the yoke connecting member 20 is attached to the base 11 while the carriage 15 is located between the magnets 23 and 24. The yoke connecting member 20 is formed by fitting the protruding parts 21B into the cut-out parts 22A by virtue of the magnetic force of the magnets 23 and 24.

As illustrated in FIG. 4, the yoke connecting member 20 is positioned on the base 11, between the holes 21C of the first yoke 21 and the circular cylinder parts 11A on the base 11 and ups and downs formed on the inner surface of the base 11. Then, the lower attaching screw 32 is passed through the hole 11C in the base 11 and threadedly inserted into the tapped hole 21D of the first yoke 21, so that the yoke connecting member 20 is fixed onto the base 11. Then, after the cover 12 is mounted on the base 11, the fixing screws 31 are passed through holes 12A of the cover 12 and through holes 22B and are screwed or threadedly inserted into the holes 11B of the circular cylinders 11A. Thus, the yoke connecting member 20 is secured between the base 11 and the cover 12.

Figure 5:
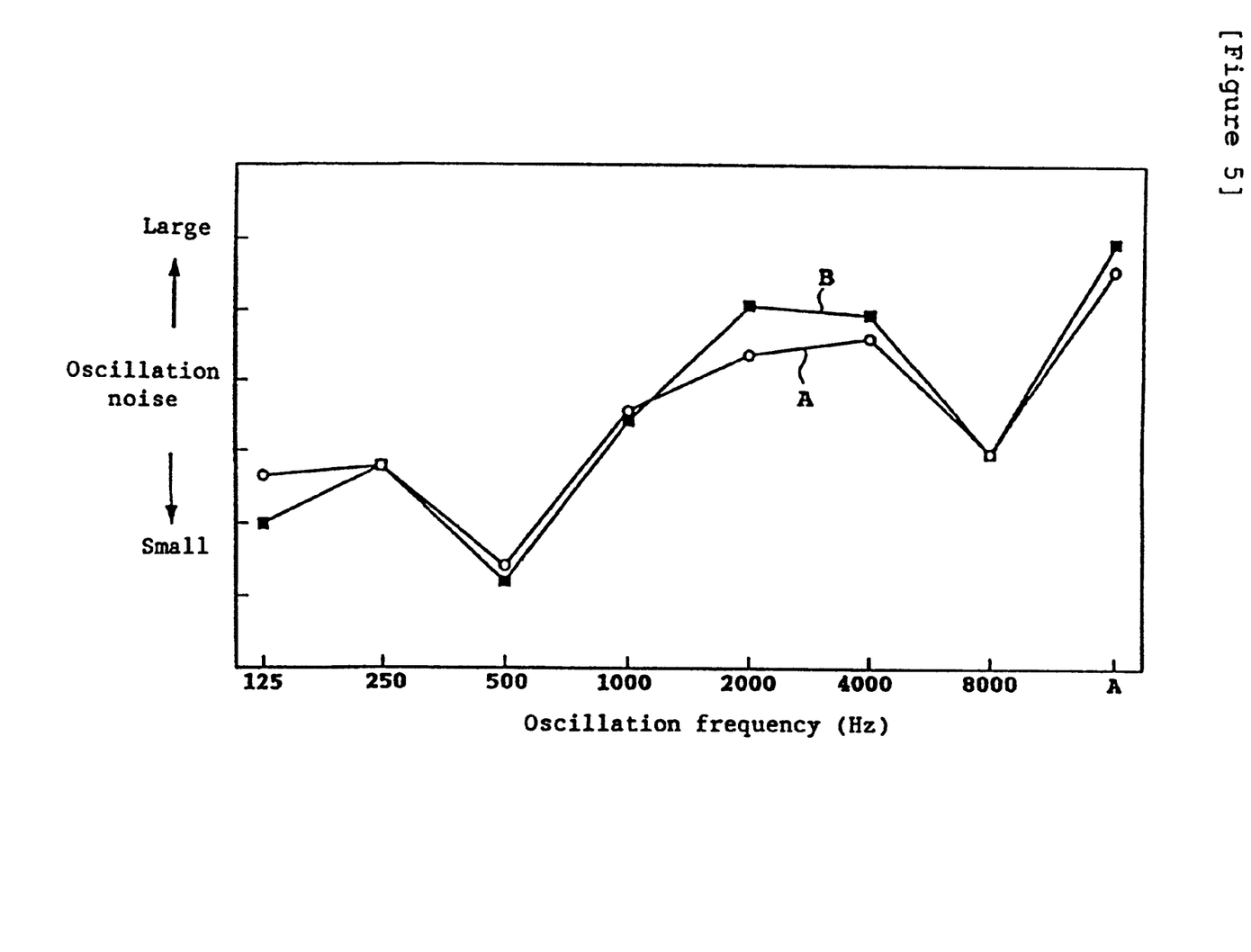
FIG. 5 is a graph showing the vibrational characteristic of the magnetic disk device shown in FIG. 1.

As a result, the yoke connecting member 20 is firmly attached to a proper position between the base 11 and the cover 12. Accordingly, when the recording head 14 is positioned on the magnetic disk 13 by rotating the carriage 15 by means of the voice coil motor M in order to write or read data by the recording head 14 on the rotating magnetic disk 13, the vibration of the yoke connecting member 20 caused by the positioning of the recording head is suppressed. A polygonal line A in FIG. 5 shows the vibrational characteristic of the voice coil motor M. As apparent from the polygonal line A, the vibration is suppressed and noise is reduced compared to the vibrational characteristic of polygonal line B of the voice coil motor so mounted as seen in FIG. 8.

Since the fixing screws 31 are secured or mounted onto the base 11 after the cover 12 is mounted on the base 11, and after the carriage 15 and the yoke connecting member 20 are mounted on the base 11, the fixing screws 31 do not become obstacles when the carriage 15 and the yoke connecting member 20 are mounted on the base 11. This is an extremely advantageous point when positioning the carriage 15. Specifically, when the carriage 15 and the yoke connecting member 20 are positioned and mounted on the base 11, as illustrated in FIG. 1, the carriage 15 is located between the opposed surfaces of the yokes 21 and 22, when the magnetic disk 13 is mounted on the base 11. The carriage 15 and the yoke connecting member 20 need to have a positional relationship as illustrated by the solid line in FIG. 2 in order to avoid the interference between the carriage 15 and the magnetic disk 13. The carriage 15 needs to be mounted in a position so that it does not interfere with the magnetic disk 13. Since the fixing screws 31 have not yet been mounted on the base, there is no member interfering with the mounting position of the carriage 15 between the yokes 21 and 22. Therefore, the mounting position of the carriage 15 can be maintained by using all the range between the opposed surfaces of the yokes 21 and 22 including positions on which the fixing screws 31 are mounted. Consequently, the mounting position of the carriage 15 can be ensured without enlarging the size of the yokes 21 and 22 as compared with the above mentioned conventional example shown in FIG. 8.

Figure 6:
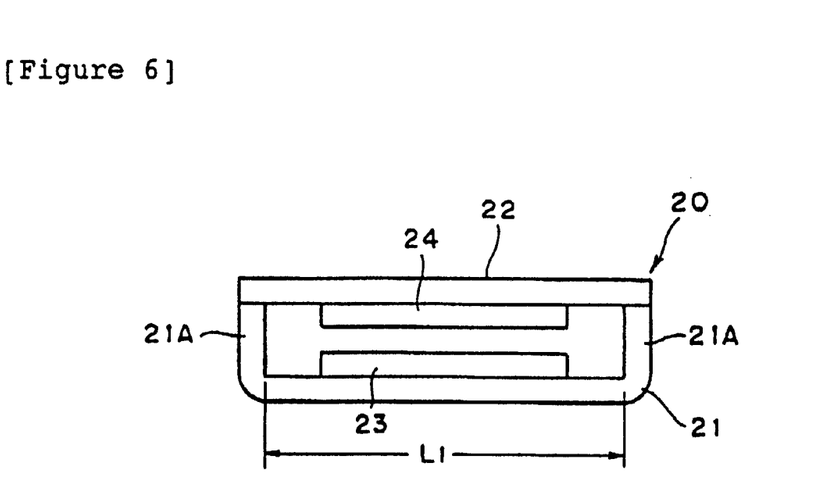
FIG. 6 is a schematic side view showing the connected form of the yoke connecting member shown in FIG. 1.
Figure 7:
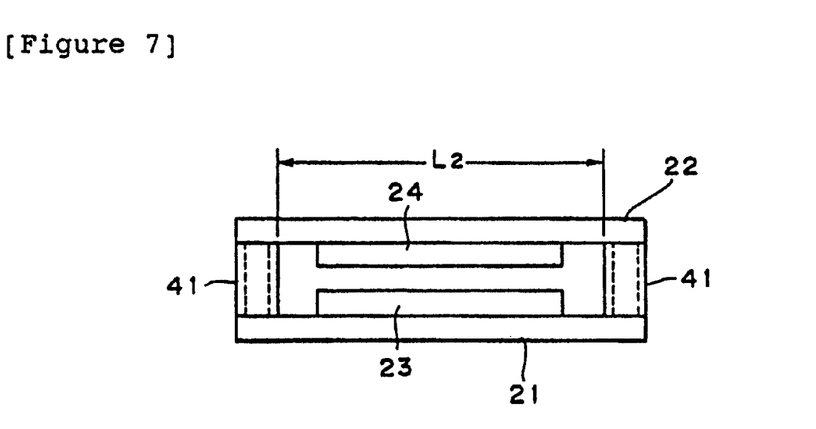
FIG. 7 is a schematic side view showing a comparative example of the connected form of the yoke connecting member.

FIG. 6 is an explanatory view for explaining the connected state of the yoke connecting member 20. A range L1 between the right and left bent parts 21A shows a region in which the voice coil motor M can move. The width of the bent part 21A corresponds to the thickness of the yoke 21. The bent parts 21A are simply bent to the end parts of the yoke 21 in their structures. Therefore, the movable range L1 is comparatively wide relative to the whole width of the yoke connecting member 20 in the horizontal direction in FIG. 6. The movable range L1 is wider than the movable range L2 of the voice coil motor M when the yokes 21 and 22 having the same size are connected together by right and left stud members 41 as illustrated in a comparative example of FIG. 7. Therefore, when the movable range L1 is to be maintained, the yoke connecting member 20 must use the bent parts 21A, so that the voice coil motor M can be made compact. The movable range L1 of the voice coil motor M can be wide, and, accordingly, the mounting position of the carriage 15 can be readily held. If the mounting position of the carriage 15 is assuredly held, the bent parts 21A may be employed at least on the upper side of the connecting parts of the yokes 21 and 22 shown in FIG. 2.

As described above, in the magnetic disk device of the present invention, the first and second yokes can be firmly or strongly secured between the base and the cover and the generation of vibration or noise can be prevented. The first yoke and the second yoke are mounted between the base and the cover by using the attaching member for attaching the first yoke to the base and the fixing screws passing through the second yoke and the first yoke from the cover and screwed to the base. Further, since the fixing screws are screwed to the base after the cover is mounted on the base, all the range of the yokes can be used when the carriage is mounted together with the yokes between the cover and the base. Furthermore, the yokes can be made more compact and thus the entire body of the magnetic disk device can be made more compact than the conventional case where the mounting position of the carriage is limited because the fixing screws are located between the opposed surfaces of the yokes.

The first and second yokes are connected together with the bent parts formed on at least one of the first and second yokes. Therefore, the movable range of the rotary actuator can be set wide. Consequently, while the size of the rotary actuator can be made compact, a desired movable range can be ensured.

We claim:

1. A magnetic disk device having a base, a cover, a rotatable magnetic disk, a rotatable carriage having a magnetic head attached to its end and a rotary actuator for rotating the carriage, the rotary actuator including a coil attached to the carriage, a first yoke having a first magnet attached thereto and positioned adjacent the coil, and a second yoke connected to the first yoke having a second magnet attached thereto and positioned adjacent the coil, the magnetic disk device comprising:

an attaching member for attaching the first yoke to the base; and a fixing screw to connect the cover, the second yoke and the first yoke to the base, the first and second yoke being positioned between the cover and the base.

2. A magnetic disk device according to claim 1, wherein at least one of the first and second yokes is provided with a bent part and the first and second yokes are connected together with the bent part.

3. A magnetic disk device according to claim 1, wherein the attaching member is an attaching screw.

* * * * *